United States Patent [19]

Furukawa et al.

[11] Patent Number: 5,238,636
[45] Date of Patent: Aug. 24, 1993

[54] PROCESSES FOR PRODUCING POROUS POLYMER FILMS AND COMPOSITE FILMS

[75] Inventors: Takeo Furukawa, Wako; Yukio Inaba, Tokyo, both of Japan

[73] Assignees: Rikagaku Kenkyusho, Wako; Kyowa Hakko Kogyo Co., Ltd., Tokyo, both of Japan

[21] Appl. No.: 769,169

[22] Filed: Sep. 30, 1991

Related U.S. Application Data

[63] Continuation of Ser. No. 434,672, Nov. 7, 1989, abandoned.

[30] Foreign Application Priority Data

Mar. 7, 1988 [JP] Japan .................................. 63-53290

[51] Int. Cl.$^5$ ........................................... B29C 67/20
[52] U.S. Cl. ................................. 264/41; 264/45.1; 264/78; 264/216
[58] Field of Search ............... 264/41, 216, 45.1, 45.8, 264/46.4, 48, 78, 299, 298

[56] References Cited

U.S. PATENT DOCUMENTS

| | | | |
|---|---|---|---|
| 4,048,271 | 9/1977 | Kesting | 264/41 |
| 4,384,047 | 5/1983 | Benzinger et al. | 264/41 |
| 4,954,381 | 9/1990 | Cabasso et al. | 264/216 |

FOREIGN PATENT DOCUMENTS

| | | |
|---|---|---|
| 48-56279 | 8/1973 | Japan . |
| 57-90028 | 6/1982 | Japan . |
| 58-16823 | 1/1983 | Japan . |
| 62-19203 | 4/1987 | Japan . |

OTHER PUBLICATIONS

Polymer Preprints, Japan vol. 37, No. 8 (1988) pp. 2255–2257.
Polymer Preprints, Japan (English Edition) vol. 37, No. 2 (1988) P.E 347 (This is an English abstract of Polymer Preprints described as (AR)).
Polymer Preprints, Japan vol. 36, No. 8 (1987) pp. 2483–2485.
Polymer Preprints, Japan (English Edition) vol. 37, Nos. 5–10 (1987) P.E 528 (This is an English abstract of Polymer Preprints described as (AT)).
Kobunshi Ronbunshu vol. 43, No. 10 (1986) pp. 669–675.
Magazine "Industrial Material" vol. 34, No. 2 (1986), pp. 31–36.
Chemical Letters, pp. 679–682 (1979).

*Primary Examiner*—Catherine Timm
*Attorney, Agent, or Firm*—Oblon, Spivak, McClelland, Maier & Neustadt

[57] ABSTRACT

A process for forming a porous polymer film formed by allowing a solvent to evaporate from a solution of polymer containing water and alcohol. It is possible to form a porous polymer film in which the size and distribution of the pores are uniformalized. Also described is a process for producing a composite film in which the pores of the porous polymer film are filled with a functional low molecular substance such as liquid crystal or dye so that the dispersion diameter of the functional low molecular substance and the distribution of the same are uniformalized. In the production of the above-mentioned porous polymer film, the size of the pores on the porous polymer film can be controlled by controlling the humidity of the forming atmosphere or the water content in the solution of polymer. It is therefore possible to obtain a fixed film having superior electrical and optical characteristics, by forming a composite film through filling the pores of the thus obtained porous polymer film with a functional low molecular substance such as liquid crystal or dye and providing electrodes on the composite film.

13 Claims, 11 Drawing Sheets

PROCESSES FOR PRODUCING POROUS POLYMER FILMS AND COMPOSITE FILMS

This application is a continuation of application Ser. No. 07/434,672, filed on Nov. 7, 1989, now abandoned.

TECHNICAL FIELD

The present invention relates to processes for production of porous polymer films and composite films.

BACKGROUND

Nowadays, liquid crystals are used in various fields. Liquid crystals have features such as optical anisotropy and easiness of change in molecule orientation under the influence of an external field such as electric field or magnetic field. In particular, ferroelectric liquid crystals are driven by a torque which is generated as a result of interaction between spontaneous polarization and electric field. This driving power is very large so that ferroelectric liquid crystals are expected to find uses as materials of high-speed display devices. There are some dyes which exhibit superior electro-optic effect under ordinary electric field or photoelectric field, as well as excellent optical characteristics such as non-linear optical effect. These functional low molecular liquid crystals and dyes have possibilities of wide variety of molecular design and exhibit diversified optical characteristics but are difficult to fix because they have high levels of fluidity.

In conventional optical display devices, functional low molecular substance such as liquid crystal is fixed by being sandwiched between a pair of plates of glass. The use of such glass plates poses problems such as difficulties encountered in achieving improvements for greater flexibility, reduced weight and increased area. In order to avert from these problems, it has been considered to use polymers which are generally flexible, light-weight and easy to form in large areas, and methods have been proposed for fixing the functional polymers. Among various polymers, ferroelectric substances exhibit superior electric characteristics such as high-dielectric constant, high-speed switching performance, piezoelectricity, pyroelectricity, electrostrictivity and so forth. Therefore, composite films formed by liquid crystal and/or dye and polymer, formed by complexing a low molecular substance and a polymer both of which are functional, are considered to have various functions in addition to the electro-optic effects and non-linear optic effects inherently possessed by the starting materials. Thus, such composite films are expected to find uses as industrial materials for various devices such as optical devices, e.g., switches and memories, second harmonic generation of semiconductor laser, photo-bistable memory, photo-processor and so forth.

The following two processes have been known as processes for forming a composite film of liquid crystal and polymer.

(1) In the first process, a film is cast-formed by solvent evaporation method (conventional method) from a solution of a mixture of liquid crystal and a polymer. Namely, a polymer such as polyvinyl chloride and polycarbonate is dissolved in a solvent in which also is dissolved liquid crystal such as N-(4-ethoxybenzylidene)-4'-butyl aniline, butyl-4-(4-ethoxyphenoxycarbonyl)-phenyl carbonate or the like, and the thus prepared solution is spread in a petri dish so as to allow the solvent to evaporate, whereby a film is formed.

(2) The second process is called water-surface developing method. A solution of mixture of liquid crystal and polymer is made to drip onto the water surface along a tank wall so that an ultra-thin film in formed by self-diffusion. A multilayer of thus obtained thin films is superposed to form a film.

Unfortunately, composite films thus formed from a functional low molecular substance such as liquid crystal or dye and polymer are still unsatisfactory in electric and optical characteristics due to non-uniform diameter of diffusion of the functional low molecular substance and non-uniform dispersion of the same.

The present inventors have proposed a composite film and a process for producing the film, wherein 65/35 mol % copolymer of vinylidene fluoride and trifluoroethylene is dissolved in a solvent which is a mixture of tetrahydrofuran and benzene, forming a porous VDF/TrFE film by making use of the difference in the boiling point and charging the liquid crystal. This method is reported in "PRE-PRINT OF LECTURE MEETING OF ASSOCIATION OF POLYMER ENGINEERING" (Vol. 36, No.8, pp. 2383-2385), published by the association of polymer engineering on Oct. 5, 1987. However, it has been difficult to obtain a porous film from the composite film produced by the reported method.

DISCLOSURE OF THE INVENTION

An object of the present invention is to provide a novel process for producing porous polymer film.

Another object of the present invention is to provide a process for producing a composite film which enables a functional low molecular substance such as liquid crystal (and/or dye) to be uniformly dispersed with uniform dispersion diameter in a polymer.

Still another object of the present invention is to provide a process for producing a composite film which enables control of diameter of functional low molecular substance in a polymer, as well as a fixed material produced by this method.

The aforementioned problems of the prior art can be overcome by a porous polymer film formed by allowing a solvent to evaporate from a solution of polymer containing water and an alcohol, and also by a composite film which is obtained by filling the pores of the porous polymer film with a functional low molecular substance.

In the production of the above-mentioned porous polymer film, the size of the pores on the porous polymer film can be controlled by controlling the humidity of the forming atmosphere or the water content in the solution of polymer. It is therefore possible to obtain a fixed film having superior electrical and optical characteristics, by forming a composite film through filling the pores of the thus obtained porous polymer film with a functional low molecular substance such as a liquid crystal or a dye, and providing electrodes on the composite film.

According to the invention, ethyl alcohol and water are used, and three molecules of ethyl alcohol form a cyclic cluster due to hydrogen bond between the ethyl alcohol molecules, and three such clusters associate to form a clathrate compound incorporating one hydronium ion, the clathrate compound being hydrogen-bonded to water molecules. Therefore, in a solution formed by dispersing a predetermined amount of aqueous alcohol in a solution formed by dissolving polymer in a good solvent, the aqueous alcohol form uniform spherical particles due to surface tension as the solvent evaporates, whereby porous structure is obtained after the evaporation of the solvent. It has been found that porous film having spherical pores can be obtained by completely evaporating aqueous alcohol from the above-mentioned porous structure by drying at a temperature not lower than 100° C. Ethyl Alcohol has hydrophilic group. Therefore, a porous film can also be obtained by dispersing a predetermined amount of alcohol in a solution formed by dissolving a high molecular substance in a good solvent, and allowing the solvent to evaporate in an environment of high humidity. The polymer composite film of the present invention, when prepared at a temperature slightly higher than the room temperature, exhibits a structure in which dispersion phases are connected through fine channels due to contraction which occurs during the formation. In contrast, when the composite film is formed at a temperature below the room temperature, a dispersion structure is obtained in which the pores are independent from one another.

It has also been found that the size of the pores in the porous polymer film can be controlled by varying the humidity of the humid environment in which the film is formed, or by varying the water content of the aqueous alcohol in the solution which is formed by dispersing a predetermined amount of the aqueous alcohol in a solution formed by dissolving a polymer in a good solvent. More specifically, the pore size and the number of the pores become greater as the humidity of environment or the water content of the aqueous alcohol is increased. Conversely, a reduction in the humidity or water content of the aqueous alcohol cause the pore size and the number of pores to become smaller.

The process for forming a porous film having micropores is preferably conducted in a vessel which is controlled to maintain atmosphere of constant temperature and humidity, because the formation of such a film tends to be adversely affected by moisture content in the air.

The invention will be described in more detail hereinunder.

According to the present invention, there is provided
(1) a process having the steps of dissolving a polymer in a good solvent, adding predetermined amounts of alcohol and water, and allowing the solvent to evaporate thereby forming a porous polymer film, or,
(2) a process in which, in the process (1), a predetermined amount of alcohol if added and sufficiently mixed and the mixture is spread in a flat petri dish and the petri dish is placed in a vessel (such as desiccator, chromato developing chamber or the like) containing atmosphere of a controlled humidity so as to allow the solvent to evaporate, whereby a porous high molecular film is obtained. Then, a liquid crystal (and/or a dye) is filled into the thus obtained porous polymer film, within drying oven under reduced pressure. Then, electrodes are attached to the porous high molecular film charged with the liquid crystal (and/or dye), so that the film can be used as the fixed film. It is possible to add auxiliary additives such as benzene, toluene, xylene and so forth to the above-mentioned alcohol as desired.

Referring to the characteristics of the liquid crystal, the liquid crystal molecules of ferroelectric liquid crystal in the ferroelectric phase are inclined at a predetermined angle to the layer surface, and the adjacent layers are similarly inclined so as to form a spiral structure of a pitch of several μm. The molecules make a conical movement at a slow speed of several tens of Hz while maintaining the spiral structure. The frequency of this movement is largely changed as a result of complexing. In particular, the pore size produces a large influence. Namely, the value of $\Delta\epsilon$ (dielectric relaxation strength) becomes lower as the pore size is reduced. On the other hand, however, the relaxation frequency is largely shifted to high-frequency side. This means that the response speed becomes higher as the pore size becomes smaller. The pitch of the spiral structure of liquid crystal is understood to be on the order of several μm, and it is considered that the spiral structure plays an important role in the oscillation of the liquid crystal molecules which provides large relaxation strength. Polarization reversal is caused when an electric field is applied to a liquid crystal which forms a spiral structure. The speed of polarization reversal is an important factor of a liquid crystal. The present invention is based upon a discovery of the fact that the reversal speed is remarkably increased when the liquid crystal is confined in pores of an extremely small pore size.

Referring to the relationship between the pore size and the relaxation frequency $f_m$ (maximum frequency of $\epsilon''$), the relaxation frequency $f_m$ depends on the pore size alone, and has no dependency on the type of polymers.

Figure 4:
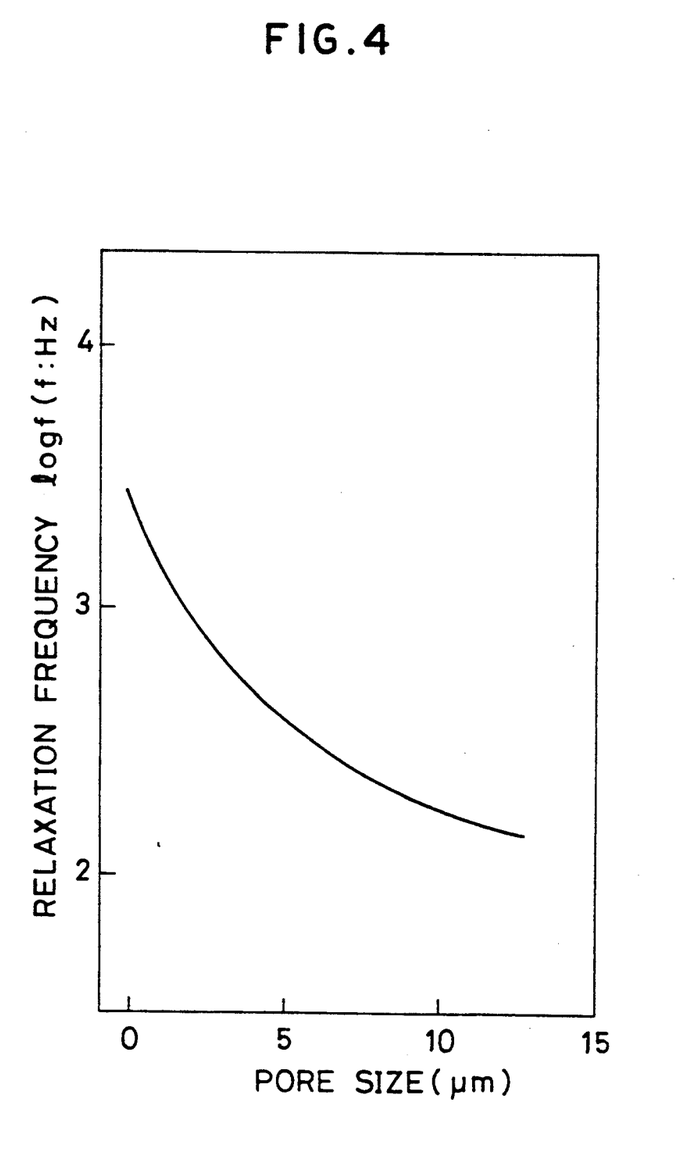
FIG. 4 is a graph showing the relationship between pore size and relaxation frequency $f_m$ as observed in a liquid crystal ZLI-3489/polymer composite film.

FIG. 4 illustrates the relationship between the pore size and the relaxation frequency $f_m$. This fact suggests that, in a composite film, the movement of the liquid crystal molecules does not take place alone but is influenced by the size of the domain due to the collective mode attributable to the twisting movement between layers of the smectic C phase.

Referring now to the switching time $\tau_s$ and the applied electric field, the logarithms of the switching time $\tau_s$ and the applied electric field are in a substantially linear relation to each other, well following the rule of power. In case of a composite film, the switching time $\tau_s$ coincides with the dielectric relaxation time so that the switching curve coincides with the dielectric relaxation time in the time region, when the level of the electric field is low. When the level of the electric field is raised, the switching time $\tau_s$ becomes smaller in accordance with the rule of power. This is attributable to the fact that, as explained before, smaller pore sizes make it difficult to form the spiral structure of Sc* phase so as to suppress the low-frequency mode of the dynamics of the liquid crystal. In consequence, the response speed is increased.

Any type of polymer can be used as the polymer employed in the present invention, provided that it can form liquid crystal (and/or dyes)/polymer fixed film. Representative examples of these high molecular substances are vinyl compounds and addition polymerization products of vinyl compounds such as polyethylene, polyacrylic acid, polymethylacrylate, polyvinylacetate, polyacrylonitrile, polyvinyl chloride and polyvinyl fluoride, methacrylate esters such as polymethacrylate, polymethylmethacrylate and polyethylmethacrylate, copolymers of vinyl compounds or fluorine compounds such as polyvinylidene chloride, polyvinylidene fluoride, vinylidene cyanate, vinylidene fluoride/trifluoroethylene copolymer, vinylidene fluoride/tetrafluoroethylene copolymer and vinylidene cyanate/vinyl acetate copolymer, fluorine-containing compounds such as polytrifluoroethylene, polytetrafluoroethylene and polyhexafluoropropylene, polyamides such as nylon 6 and nylon 66, polyesters such as polyimide, polyurethane, polypeptide and polyethylene terephthalate, and polyethers such as polycarbonate, polyoxymethylene, polyethylene oxide and polypropylene oxide.

These polymers which are commercially available may be used alone or in the form of a series composed of various polymer. The combination of the high molecular substances should be determined by taking into consideration not only high compatibility and good film formability but also properties of the product film such as chemical stability, weather resistance, impact resistance (thermal and mechanical) and so forth.

The solvent for dissolving the polymer is preferably a good solvent. For instance, tetrahydrofuran, cyclohexanone, methylethylketone and dimethylformamide and so forth can be used for polyvinylchloride. Chloroform, methanol, acetone and butyl acetate and so forth are usable for polyvinyl acetate. Acetone, ethyl acetate, tetrahydrofuran and toluene and so forth are usable for polyacrylate ester and polymethacrylate ester. Dimethylformamide and so forth can be used for polyacrylonitrile. Benzene, dimethylformamide and so forth can be used for polyethylene oxide. Ketones such as acetone, methylethylketone, cyclohexanone ketone and so forth, esters such as methyl acetate, methyl acrylate and so forth, cyclic ethers such as ethylene oxide, propylene oxide, tetrahydrofuran, dioxan and so forth, amines such as n-butylamine and so forth, and amides such as dimethylformamide, dimethylacetoamide and so forth can be used for vinylidene fluoride, vinylidene cyanate and their copolymers. The amount of addition of the above-mentioned solvent relative to the polymer is not limited. Considering the film formability, however, the density of the solution preferably ranges between 20 and 0.5%.

Any type of liquid crystal can be used as the liquid crystal employed in the invention, provided that it can form a liquid crystal/polymer fixed film.

Examples of such liquid crystal are: nematic liquid crystals such as p-azoxyanisole, choresteryl nonanoate, 4-methoxy benzylidene-4'-n-butylaniline, 4-methoxy-4'-butylazoxybenzene, 4,4'-dimethoxy azobenzene, p-azoxyanisole, 4-cyano-4'-n-pentyl biphenyl, p-2-methoxybutyl-p'-cyano biphenyl, and so forth; smectic liquid crystals such as terephthal-bis-butylaniline, N-(4-cyanobenzylidene)-4'-n-octyloxyaniline, dodecyloxy azobenzene, p-(p'-phenylbenzal amino) ethyl benzoate, 4-heptyloxybenzylidene-4'-benzyaniline, 4-butyloxylbenzal-4-ethylaniline, 4-(4'-phenylbenzylidene amino)-n-butylcinnamate, 4-(4'-decyloxy benzylidene amino)-2-methylbutylcinnamate, 4-(n-hexyloxy)(henyloxy-4''-(2-methylbutyl) biphenyl-4'carboxylate, ZLI-3489, and so forth; choresteric liquid crystal such as choresteryl nonanoate, (−)-2-methyl-p-(p'-methoxybenzylidene amino) cinnamate, choresteryl myristate, halides of choresterol, esters of choresterol and so forth, and discotic liquid crystal such as hexabutoxy triphenylene.

One of these liquid crystals may be used alone or a combination of two or more of these liquid crystals may be used in order to improve basic performance such as phase transition temperature, temperature range, chemical stability, film formability, and so forth.

The dye (including pigments) used in the present invention may be those which have been conventionally mixed with liquid crystals for the purpose of attaining light-absorption anisotrophy of the dyes. Examples of such dye are bicolor dyes such as of azo-type, anthraquinone-type, tetradine type, and coumarin-type; dyestuffs having non-linear optical characteristics such as 4-dimethylamine-4'-nitrostilbene, o-(m-p-)nitroaniline, merocyanine and so forth, and near-infrared absorption coloring materials such as bis(1-thio-2-phenolate)nickel-tetrabutylammonium, bis(1-thio-2-naphthalate) nickel-tetrabutylammonium, bis(1,2,3,4-tetrachloro-5,6-dithiophenolate)nickel (II) tetra-n-buthylammonium.

The alcohol used in the present invention is preferably a lower alcohol such as a methanol, ethanol and so forth. Although not exclusively, the amount of addition of alcohol should be selected so as not to allow precipitation of the polymer, preferably 5 to 30% with respect to the common solvent.

The water used in the present invention is preferably a pure water. The water may be added in any desired amount relative to the amount of alcohol provided that the addition does not allow precipitation of polymer. The size of pores in the porous polymer film, however, varies according to the water content. From this point-of view, the amount of water added to the alcohol is preferably selected to range between 5 and 50% relative to the alcohol. In another process of the invention, a solution is formed by dissolving polymer in a good solvent and, after a predetermined alcohol is uniformly dispersed in the solution, the solvent is allowed to evaporate in an environment of high humidity, whereby a porous polymer film is formed. The relative humidity of the environment varies according to the type of solvent, although it preferably ranges between 60 and 100%, more preferably between 75 and 95%.

The porous polymer film produced by the process of the present invention has uniform pore size and uniform pore distribution by virtue of the fact that aqueous alcohol exists in the form of micro-particles uniformly in the solution of the polymer until the film is formed. In addition, since the dispersion phase is formed of alcohol, the film can be formed without being impeded by the dispersion phase, thus offering remarkable improvement in their mechanical strength and dimensional stability. These features are quite advantageous when the porous fixed film of the present invention is used as an industrial material.

EXAMPLES

The present invention is described below in more detail by referring to Examples.

EXAMPLE 1

A cast film was formed by forming a mixture of 7 parts of vinylidene fluoride-trifluoroethylene copolymer and 3 parts of methyl methacrylate, dissolving the mixture in 100 parts of a methylethylketone solvent, adding 20 parts of methyl alcohol and 3 parts of pure water to the solution, allowing the solution to spread on a flat petri dish, and allowing the solvent to evaporate slowly. An SEM (Scanning Electronic Microscope) image of the film showed that the film was a porous film having pore size of 5 $\mu$m, the pores being connected through the channels so as to form a continuous layer.

A composite film was produced by impregnating and filling the above-mentioned film with liquid crystal ZLI-3489 (produced by Merc) at 80° C. in a drying oven reduced pressure. The composite film was heated again to 120° C., so that ZLI-3489 was exuded to the surface of the film. This means that the liquid crystal ZLI-3489 exudes through a continuous phase domain composed of the pores in the matrix formed by the vinylidene fluoride-trifluoroethylene copolymer and the methyl methacrylate, well corresponding to the SEM image. This phenomenon is observed in a temperature range above 87° C. which is the transition temperature from the choresteric phase to isotropic phase.

EXAMPLE 2

A solution was formed by 7.5 parts of vinylidene fluoride-trifluroethylene copolymer (vinylidene fluoride content 65%) in 100 parts of tetrahydrofuran (THF) solvent. After mixing 10 parts of ethyl alcohol in the solution, the mixture was made to spread on a petri dish and was heat-treated for 8 hours at 100° C. in a chromato-cell in which relative humidity was controlled to 80%, so that alcohol and water were removed and a porous film was obtained. An SEM image of this film showed that this film was a porous high molecular film having a pore size ranging between 4 and 5 $\mu$m.

Figure 1:
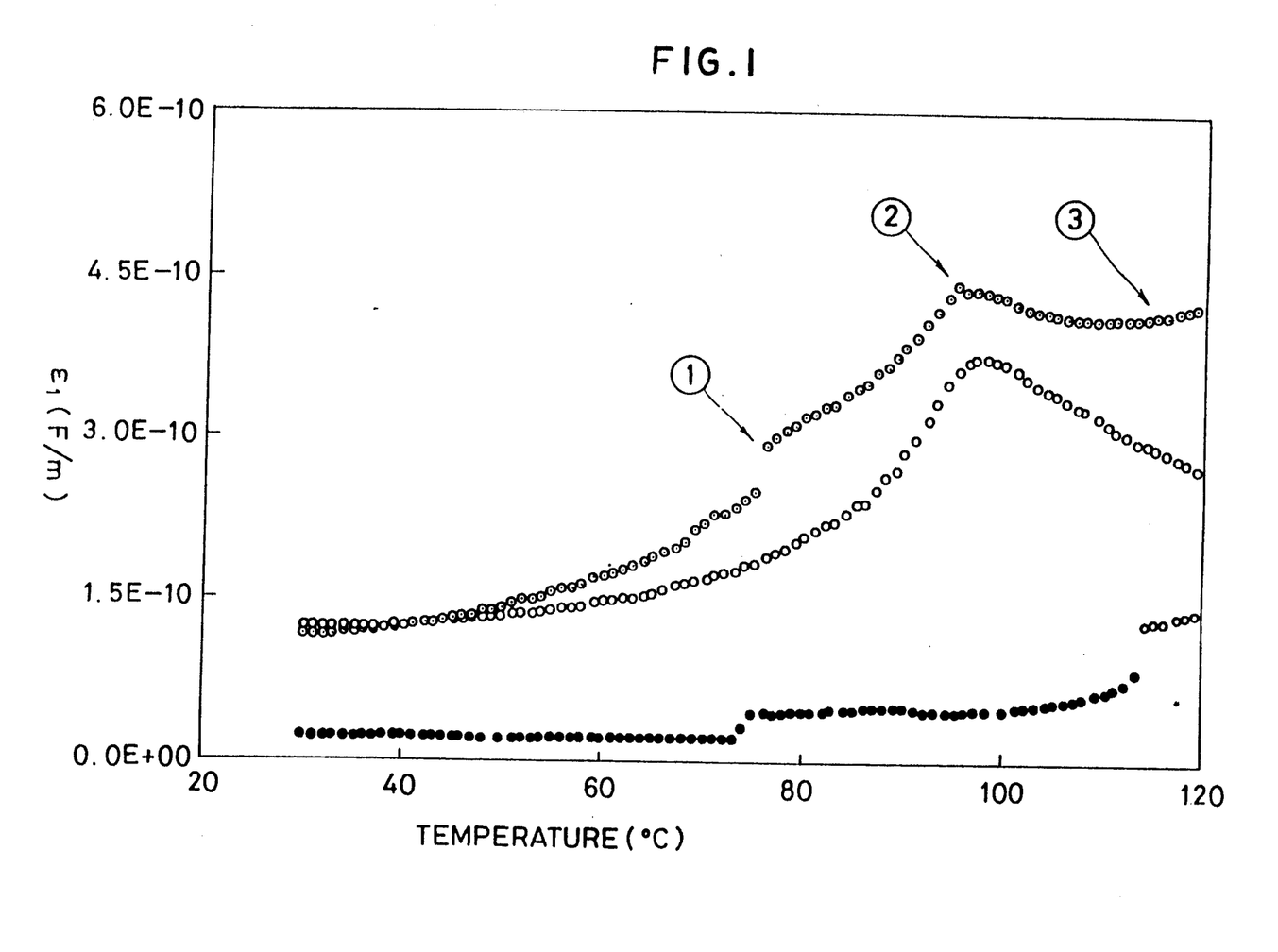
FIG. 1 is a graph showing temperature dispersion of linear dielectric constant of a composite film of Example 2 and and linear dielectric constants of vinylidene fluoride-trifluoroethylene copolymer and DOBAMBC used as the starting materials, wherein the dielectric constants of the composite film, the vinylidene fluoride-trifluoroethylene copolymer and DOBAMBC are represented by marks ⊙, ○ and ●, respectively.
Figure 2:
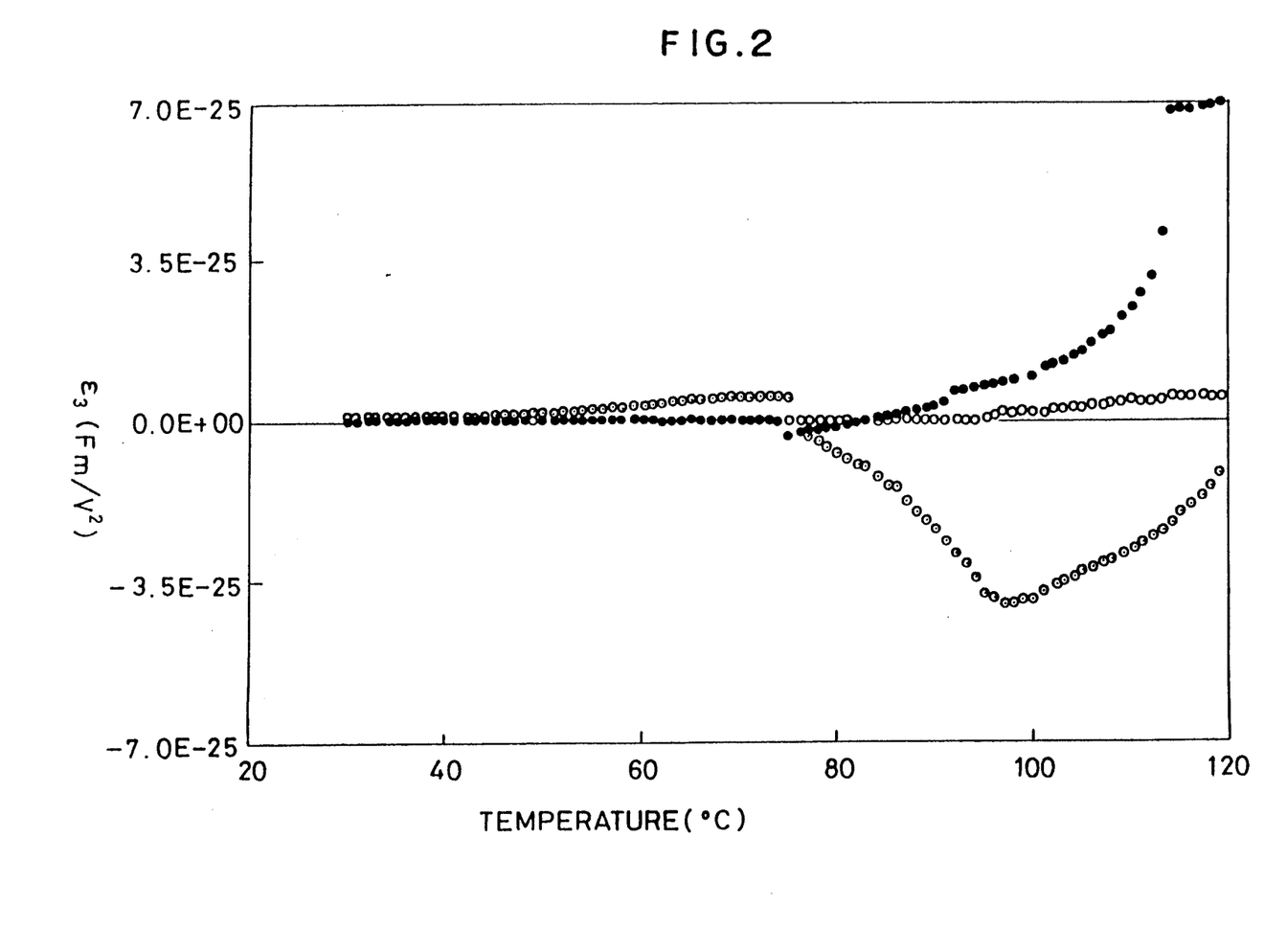
FIG. 2 is a graph showing temperature dispersion of third-order non-linear dielectric constant of the composite film of Example 2 and third-order non-linear dielectric constants of vinylidene fluoride-trifluoroethylene copolymer and DOBAMBC used as the starting materials.

The thus formed porous film was impregnated and charged with 2.5 parts of 4-(4'-n decyloxybenzylidene amino)2-methylbutylcunnamate (DOBAMBC). Then, electrodes were attached to the film thus obtaining a test piece. Temperature dependency of dielectric constant of this test piece was measured, as well as temperature dependencies of dielectric constants of the vinylidene fluoride-trifluoroethylene copolymer which were used as starting materials. Temperature dispersion of the linear dielectric constants $\epsilon_1$ and third-order non-linear dielectric constants $\epsilon_3$ as observed in the course of temperature rise are shown in FIGS. 1 and 2. FIG. 1 is a graph showing temperature dispersion of linear dielectric constant $\epsilon_1$ of a composite film of Example 2 and linear dielectric constants of vinylidene fluoride-trifluoroethylene copolymer and DOBAMBC used as the starting materials, while FIG. 2 is a graph showing temperature dispersion of third-order non-linear dielectric constant $\epsilon_3$ of the composite film of Example 2 and third-order non-linear dielectric constants of vinylidene fluoride-trifluoroethylene copolymer and DOBAMBC used as the starting materials. (The dielectric constants of the composite film, the vinylidene fluoride-trifluoroethylene copolymer and DOBAMBC are represented by marks ⊚, ○ and ●, respectively.)

The DOBAMBC and vinylidene fluoride-trifluoroethylene copolymer are incompatible, so that characteristics of both phases are introduced into the dielectric characteristic of the composite film. Thus, the dielectric constants $\epsilon_1$ and $\epsilon_3$ jump at the respective phase transition points. Referring to FIG. 1, the peak of the curve (1) showing the characteristic of the liquid crystal high molecular composite film appears at the transition point (76°) at which a phase change from the crystalline phase of DOBAMBC to the SmC$\star$ phase occurs. The peak of a curve (2) appears at 95° C. which is the Curie point of the vinylidene fluoride-trifluoroethylene copolymer. The peak of the curve (3) appears at the phase transition (117° C.) at which the phase of DOBAMBC is changed from SmA phase to isotropic phase.

It is to be noted that the composite film exhibits dielectric constants greater than those of the DOBAMBC and vinylidene-trifluoroethylene. This suggests that a multiplicative effect has been obtained in this composite system. It is also to be noted that the jumps of $\epsilon$ exhibited by the composite film at the transition point of DOBAMBC is greater than that exhibited by DOBAMBC. This means that the polarization reversal of the liquid crystal can be controlled more easily.

For the purpose of comparison, a film was cast-formed through a conventional method employing tetrahydrofuran as the common solvent for vinylidene tetrafluoride-trifluoroethylene copolymer and DOBAMBC. The comparison film thus formed had on its one side a layer rich in DOBAMBC and at the other side a layer rich in the vinylidene fluoride-trifluoroethylene copolymer, thus exhibiting non-uniform structure. This non-uniform composite film had a dielectric constant which ranges intermediate between the dielectric constants of both phases. This suggests that quite an ordinary complexing reaction has taken place.

EXAMPLE 3

7.5 parts of vinylidene fluoride-trifluoroethylene copolymer was dissolved in 100 parts of tetrahydrofuran, and 10 parts of ethyl alcohol and 3 parts of pure water were added. After a sufficient mixing, the mixture was made to spread on a flat petri dish and was formed into a film by a solvent evaporation method. Then, the film was heat-treated at 100° C. for 6 hours in a drying oven under reduced pressure, whereby a cast film was obtained. The cast film had pores of about 8 $\mu$m mutually connected through fine channels so as to form a continuous phase.

The thus obtained film was impregnated and filled with 2.5 parts of liquid crystal ZLI-3489 at 90° C. in a dry-drying oven under reduced pressure, whereby a composite film was obtained. Then, electrodes were attached to the composite film, thus completing a test piece which was subjected to measurement of temperature dependency of dielectric strength.

Figure 3:
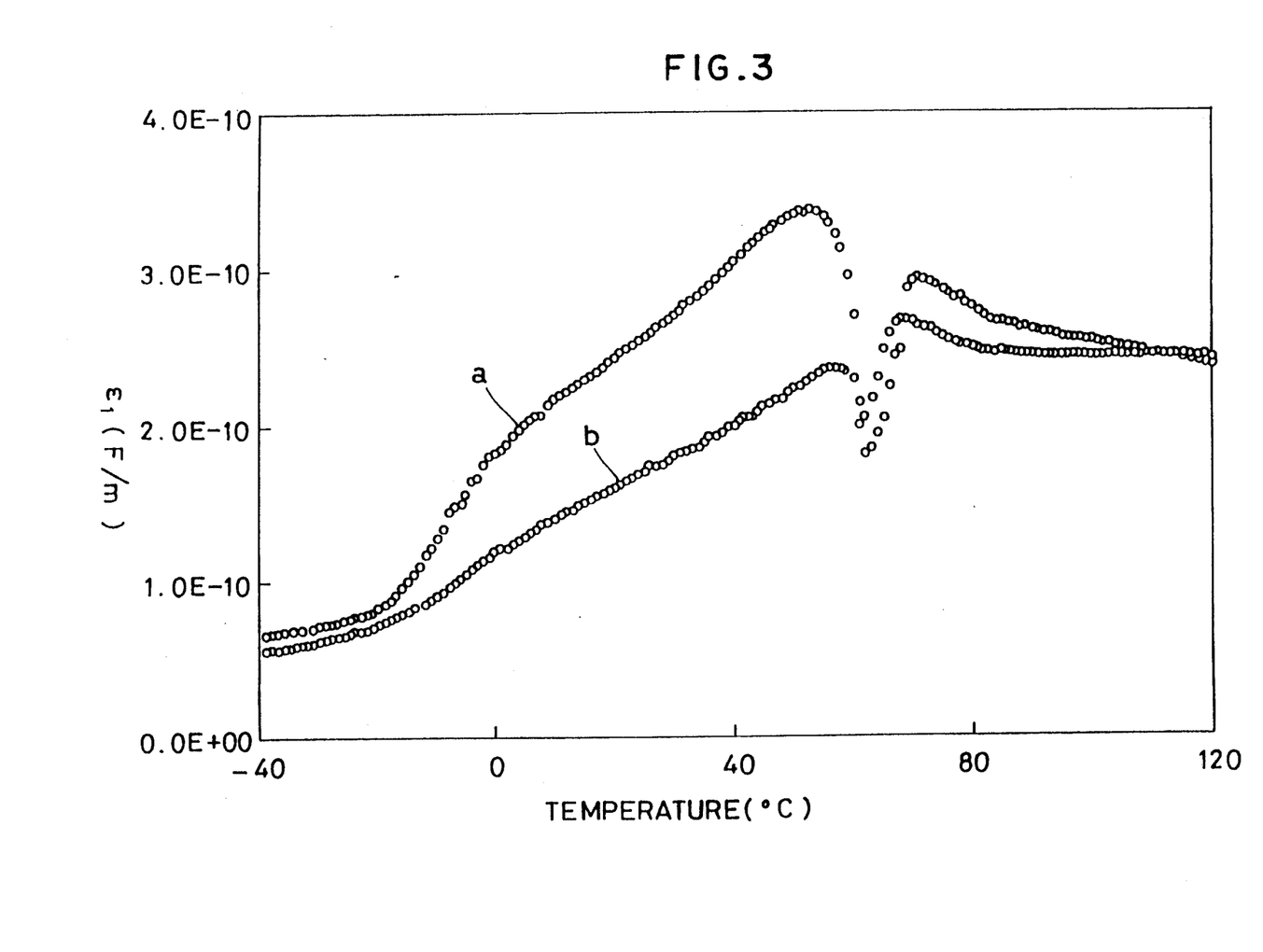
FIG. 3 is a graph showing the non-linear dielectric constant of a composite film of Example 3 and a composite film produced by conventional method.

A similar measurement was conducted for the purpose of comparison on a cast film formed through a conventional method by using 100 parts of tetrahydrofuran as the common solvent for 7.5 parts of vinylidene fluoride-trifluoroethylene copolymer and 2.5 parts of the liquid crystal ZLI-3489. Temperature dispersions of the linear dielectric constants $\epsilon_1$ are shown in FIG. 3. (Curves (a) and (b) correspond, respectively, to the composite film employing the porous polymer film prepared by the process of the invention and the composite film prepared by the conventional method.) Referring to FIG. 3, the peak appearing in the temperature region of $-20°$ to $60°$ C. corresponds to the ferroelectric phase of the liquid phase of the liquid crystal ZLI-3489, while the peak around 70° C. corresponds to the Curie point of the vinylidene fluoride-trifluoroethylene copolymer. As will b understood from the difference between these two charts, the composite film obtained by impregnating a porous film with liquid crystal exhibits a much greater jump of dielectric constant in the ferroelectric phase than that of the composite film prepared by the conventional method. This suggests that the polarization reversal of the liquid crystal can be controlled more easily.

EXAMPLE 4

A process was carried out in the same manner as Example 3 except that the liquid crystal ZLI-3489 was substituted by a mixture formed by dissolving 0.5 g of o-nitroaniline in 0.5 cc of ethyl alcohol and mixing this solution with 2.5 g of ZLI-3489, so that a composite film was obtained with fine globular dispersions of liquid crystal/dye mixture in the polymer.

EXAMPLE 5

7.5 parts of polycarbonate was dissolved in 100 parts of tetrahydrofuran, and 10 parts of ethyl alcohol and 3 parts of pure water were added. After a sufficient mixing, the mixture was made to spread on a flat schale and was formed into a film by a solvent evaporation method. Then, the film was heat-treated at 100° C. for 6 hours in a drying oven under reduced pressure, whereby a cast film was obtained. The cast film had pores of about 12 $\mu$m mutually connected through fine channels so as to form a continuous phase. Similar processes were carried out with water contents of 1.5 parts, 0.5 part and 0.2 part, respectively, so that cast films having pore sizes of 5 $\mu$m, 1 $\mu$m and 0.1 $\mu$m were obtained.

Figure 5A:
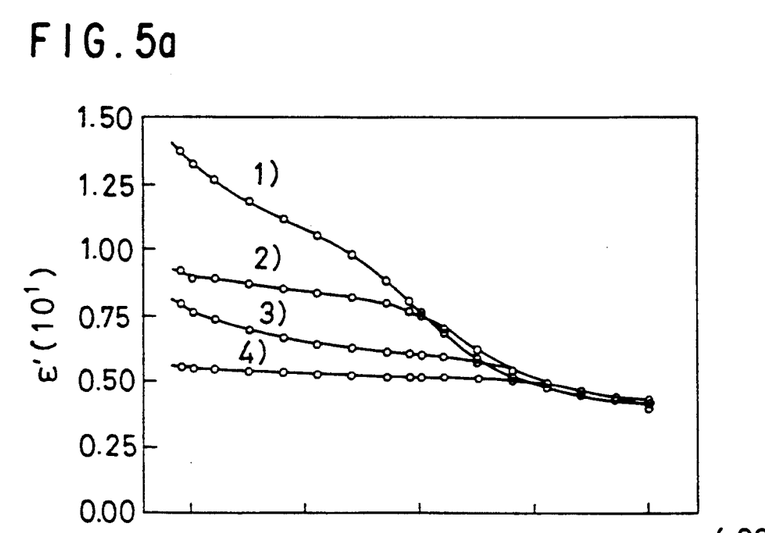
FIG. 5 is a graph showing frequency spectrum of linear dielectric constant of a liquid crystal ZLI-3489/porous polycarbonate composite film.
Figure 5B:
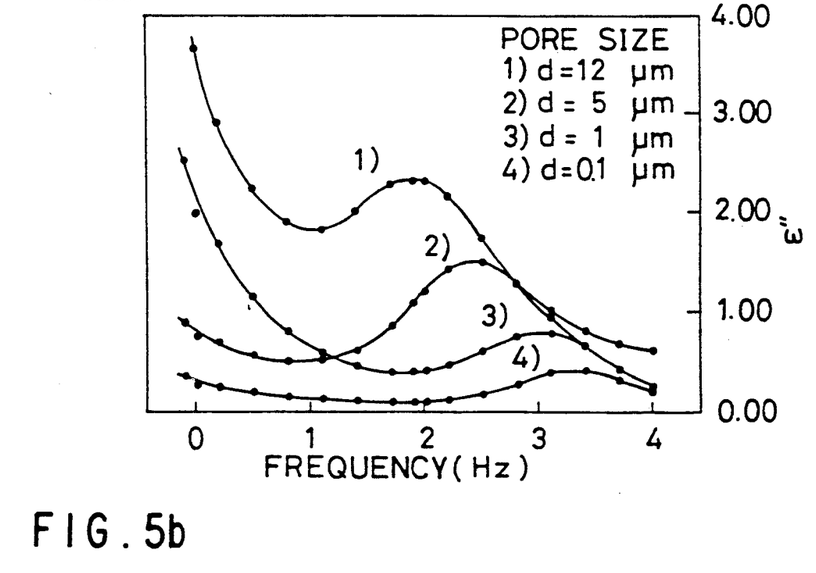
Figure 6:
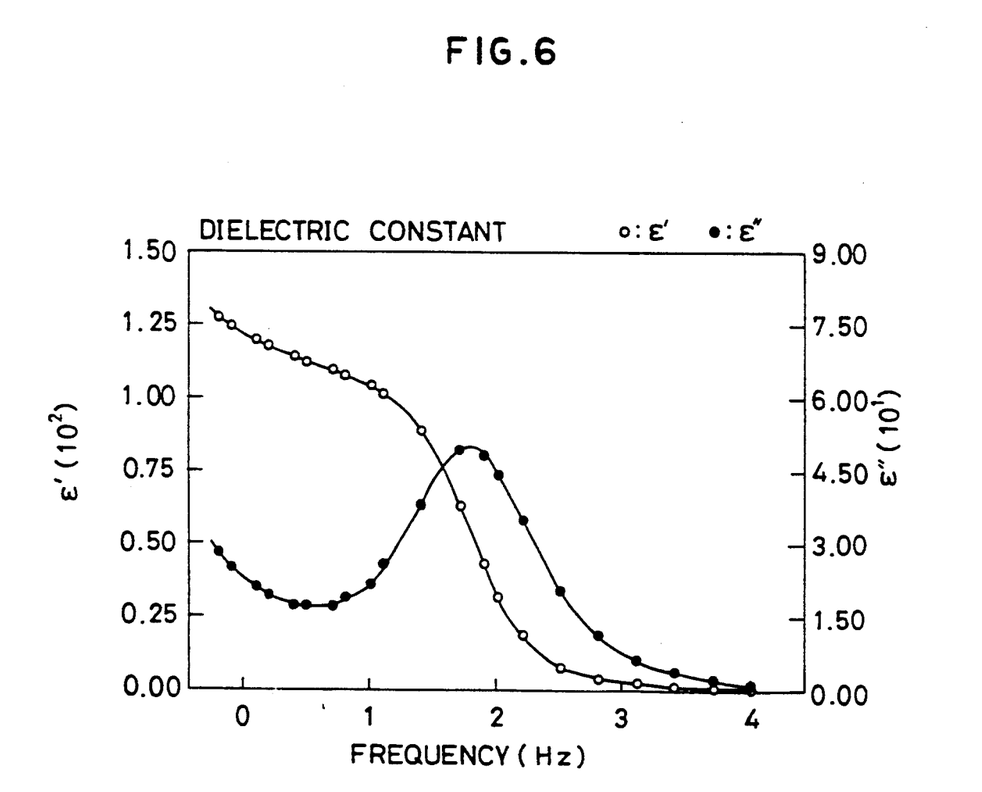
FIG. 6 is a graph showing frequency spectrum of a liquid crystal ZLI-3489.

Each of the thus obtained film was impregnated and filled with 2.5 parts of liquid crystal ZLI-3489 at 90° C. in a drying oven under reduced pressure, whereby a composite film was obtained. Then, electrodes were attached to the composite film, thus completing a fixed liquid crystal film as a test piece. Frequency spectrums of the linear dielectric constants of composite films and liquid crystal are shown in FIGS. 5 and 6. The volumetric ratios of the liquid crystals in the respective test pieces of composite film are 20 to 25%. The dielectric relaxation strength $\Delta\epsilon$ is determined by subtracting the instantaneous dielectric strength $\epsilon\infty$ from the equilibrium dielectric constant $\epsilon'$ at which an equilibrium state of the real portion of the dielectric constant is obtained. From the characteristic curve of $\epsilon'$ in FIG. 5, therefore, it is understood that the $\Delta\epsilon$ is decreased as the pore size becomes smaller (reduced from 12 $\mu$m to 0.1 $\mu$m). From the characteristic curve of the imaginary part $\epsilon''$ of the dielectric constant in FIG. 5, frequencies of 80 Hz, 300 Hz, 1000 HZ and 3000 Hz are read on the axis of abscissa (logarithmic scale) corresponding to peak positions of relaxation for the pore sizes of 12 $\mu$m to 0.1 $\mu$m. It will be understood that the relaxation frequency has been largely shifted to higher side. While the liquid crystal by itself exhibits a relaxation frequency of 60 HZ, the porous polymer film of the present invention, having the pore sizes of 12 $\mu$m, 5 $\mu$m, 1 $\mu$m and 0.1 $\mu$m respectively exhibit relaxation frequencies of 80 Hz, 300 HZ, 1000 HZ and 3000 HZ. Since the response speed can be expressed by $\frac{1}{2}\pi f$, the response speed exhibited by the liquid crystal alone is about 2.65 ms, whereas the composite films of pore sizes of 12 $\mu$m, 5 $\mu$m, 1 $\mu$m and 0.1 $\mu$m respectively exhibit 1.98 ms, 530 $\mu$s, 159 $\tau_s$ and 53 $\mu$s, thus showing a tendency that the response speed becomes higher as the pore size is reduced.

EXAMPLE 6

Figure 7:
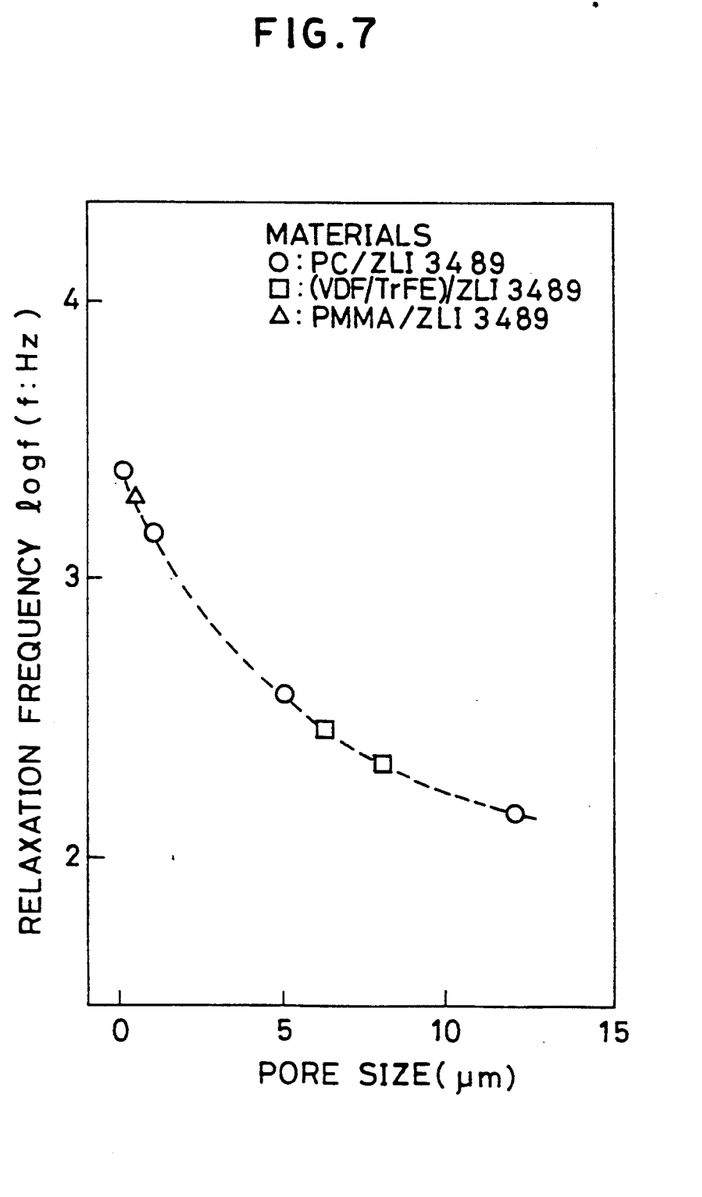
FIG. 7 is a graph showing relaxation frequencies $f_m$ for the composite films of various porous polymers with the liquid crystal ZLI-3489.

FIG. 7 shows relationships between the pore size and the relaxation frequency $f_m$ (maximum frequency of $\epsilon''$), as obtained from the frequency spectrums of linear dielectric constants of the four types of polycarbonate/ZLI-3489 fixed films of different pore sizes obtained in Example 5, a (VDF/TrFE)/ZLI-3489 fixed films of pore sizes of 8 $\mu$m and 6.3 $\mu$m, and a polymethyl methacrylate/ZLI-3489 fixed film having a dispersion particle size of 0.1 $\mu$m cast-formed through solvent evaporation method. It will be seen that the relaxation frequency $f_m$ depends only on the pore size or dispersion particle size of the porous polymer film and does not have any dependency on the type of the polymer.

EXAMPLE 7

Figure 8:
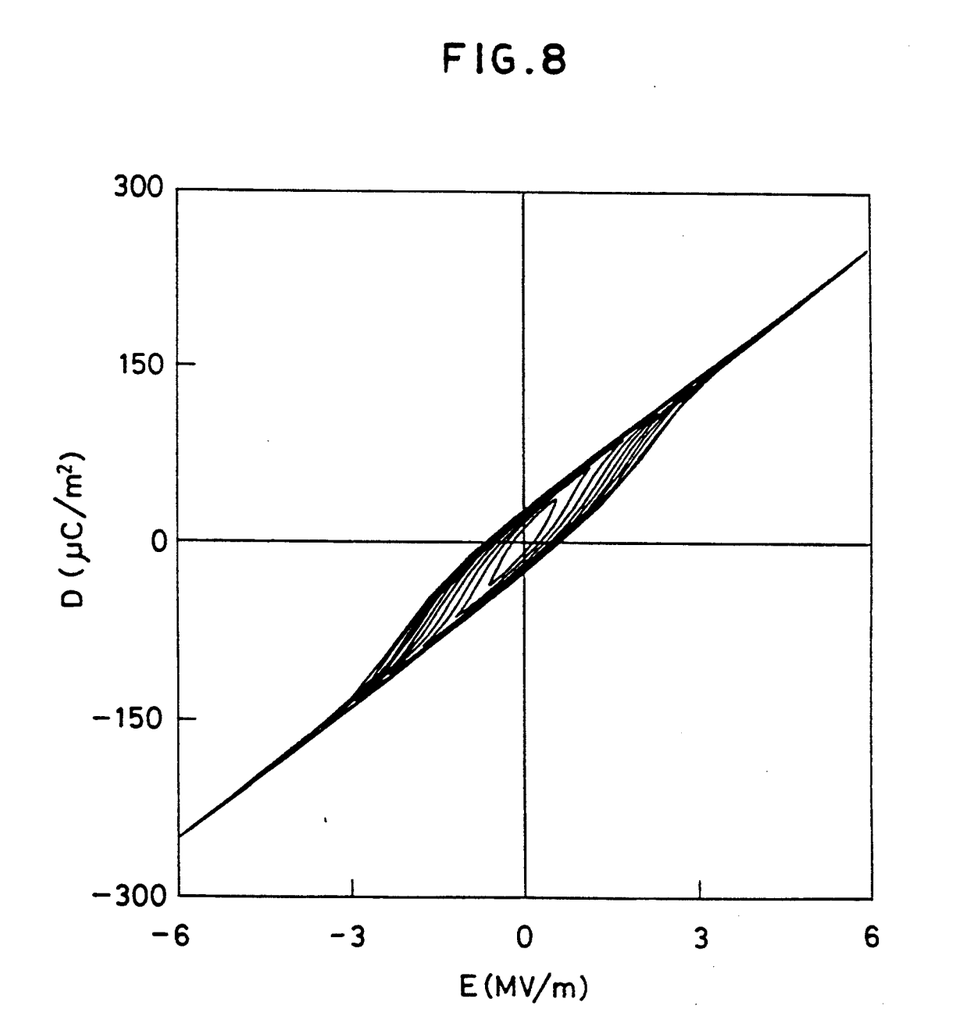
FIG. 8 is a graph showing the DE hysteresis loop of the liquid crystal ZLI-3489/porous polycarbonate composite film.
Figure 9:
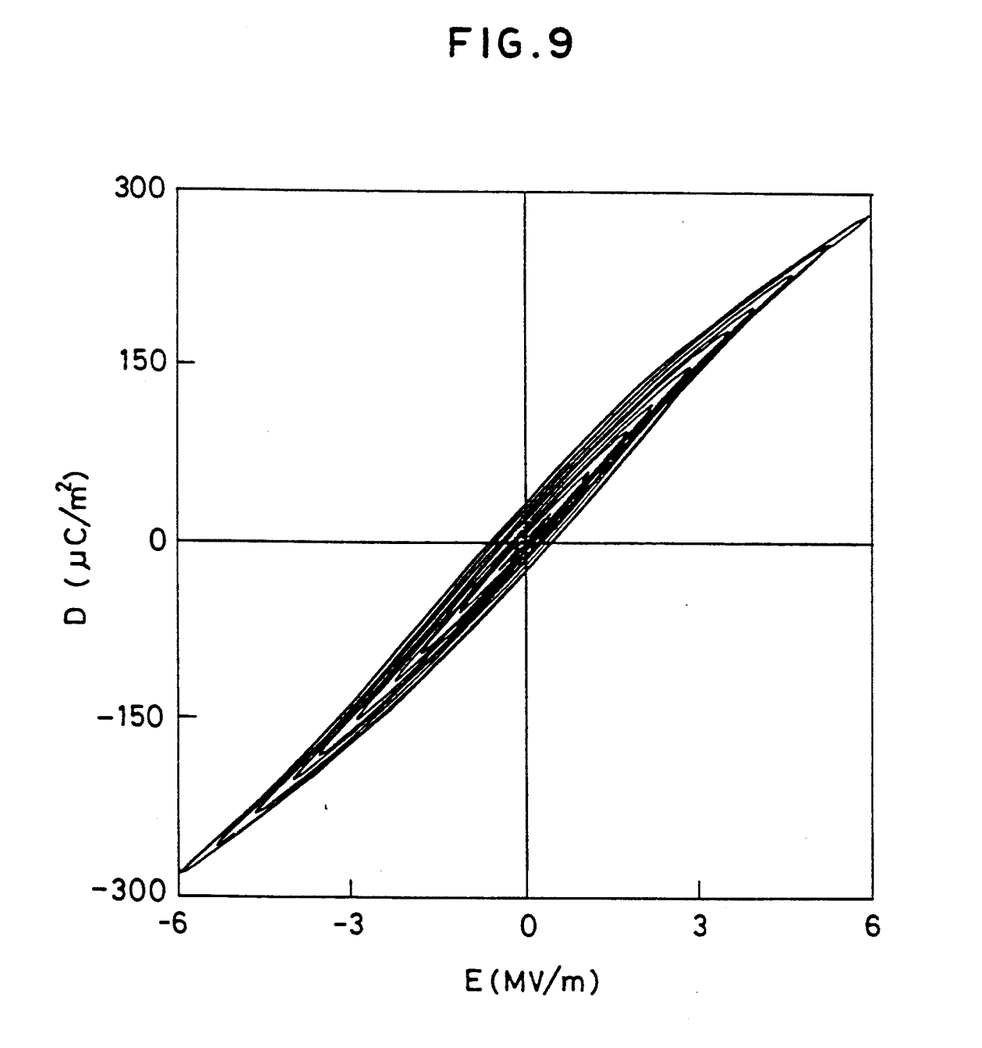
FIG. 9 is a graph showing the DE hysteresis loop exhibited by the liquid crystal ZLI-3489/porous polycarbonate composite film prepared by a conventional method.

7.5 parts of polycarbonate was dissolved in 100 parts of THF solvent and 10 parts of ethyl alcohol was added. The mixture was made to spread on a flat schale which was placed in a chromato-developing chamber maintaining an atmosphere the relative humidity of which was controlled to 80%, so that the solvent was evaporated and a film was formed. The film was then treated at 100° C. for 8 hours in a drying oven under reduced pressure, whereby a cast film was obtained. An SEM image of this cast film showed that this film was a porous film having a pore size of 12 $\mu$m, the pores being mutually connected through fine channels so as to form a continuous phase. The thus obtained film was impregnated and filled with the liquid crystal ZLI-3489 at 80° C. in a drying oven under reduced pressure, so that a composite film was obtained. Then, electrodes were attached to the composite film thus completing a test piece. For the purpose of comparison, a composite film was cast-formed through a conventional method employing 100 parts of THF as a common solvent for 7.5 parts of polycarbonate and 2.5 parts of the liquid crystal ZLI-3489. An SEM image of this film showed that the liquid crystal is non-uniformly dispersed in the form of liquid particles of a size of about 5 $\mu$m throughout the high molecular substance and that the structure was distinctively divided into an upper layer rich in the liquid crystal and a lower layer rich in the polymer. Electrodes were attached to this film so as to form a test piece. FIGS. 8 and 9 show, respectively, the DE hysteresis loop of the system obtained by charging the porous film of the invention with the liquid crystal and the system cast-formed by the conventional method. From FIG. 8, it will be understood that the liquid crystal ZLI-3489 in the system obtained by filling the porous film with liquid crystal performs a ferroelectric polarization reversal.

Residual polarization of ZLI-3489 is 300 $\mu C/m^2$. In the composite film, therefore, 1/10 of the polarization has been seemingly inverted. In contrast, in the case of the composite film prepared by the conventional method, the DE hysteresis curve is not so neat as that of the structure obtained by impregnating a porous film with liquid crystal, as will be seen from FIG. 9.

EXAMPLE 8

Figure 10A:
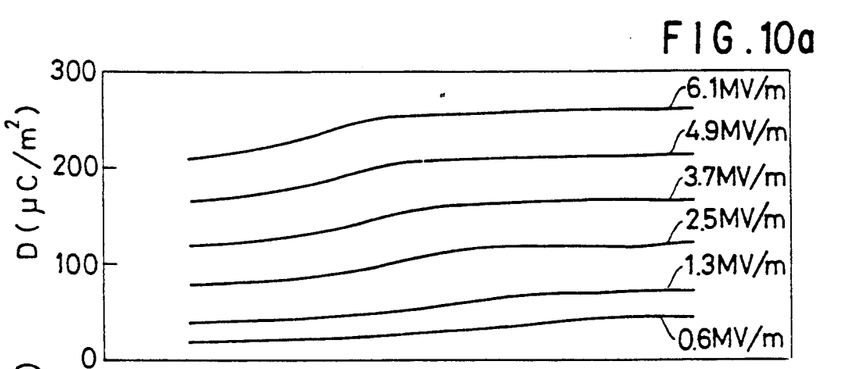
FIG. 10 shows the result of switching characteristics of the liquid crystal ZLI-3489/porous polycarbonate composite film. The pore size is 12 μm.
Figure 10B:
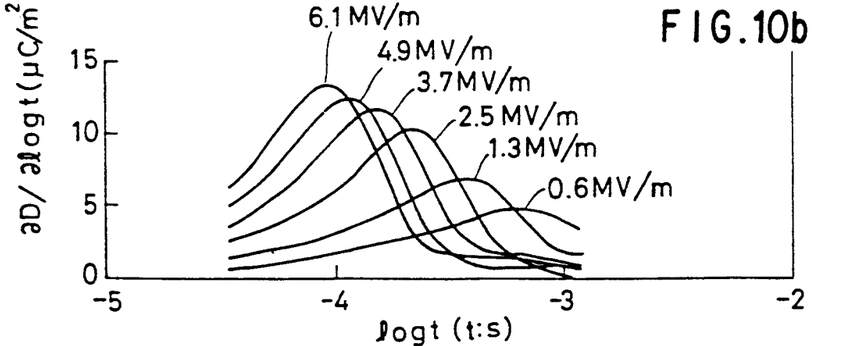

FIG. 10 shows results of measurement of switching characteristics of the PC/liquid crystal ZLI-3489 fixed film having pore size of 12 $\mu m$ obtained in Example 5. Electrical displacement D under application of stepped electrical field and the differentiation $\partial D/\partial \log t$ are plotted in relation to log t. It will be seen that the switching time $\tau_s$ becomes shorter as the electric field intensity is increased and that the peak position and, hence, the reversal speed are increased as the electric field intensity becomes higher.

EXAMPLE 9

Figure 11:
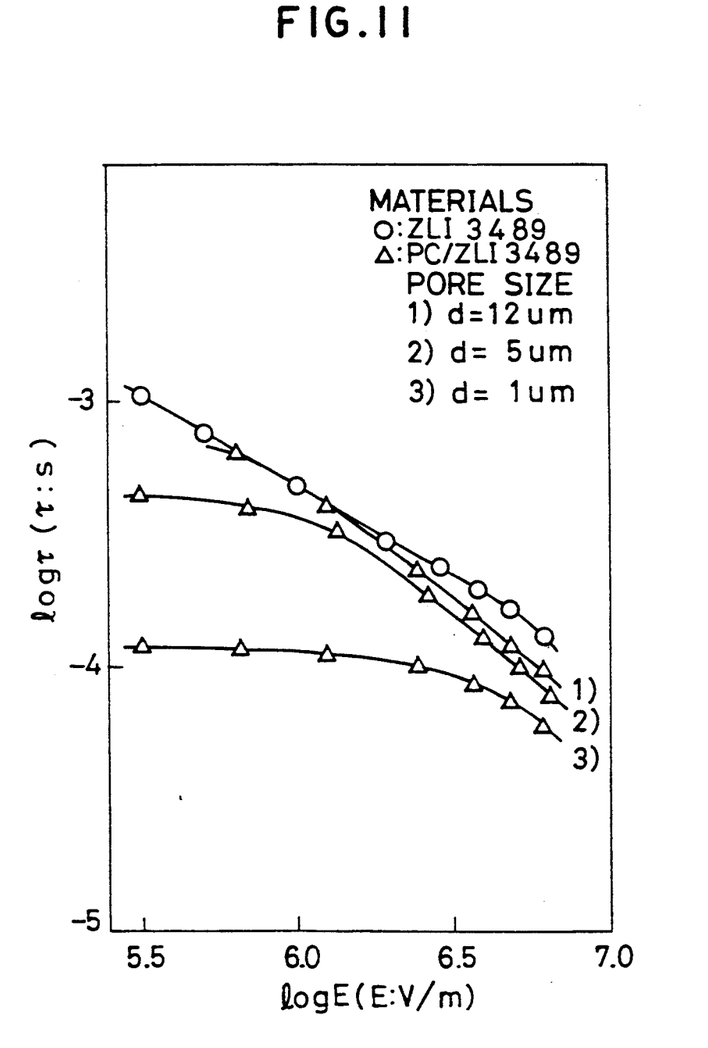
FIG. 11 is a graph showing the relationship between the switching time $\tau_s$ and applied electric field for the liquid crystal ZLI-3489 and the liquid crystal ZLI-3489/porous polycarbonate composite film.

FIG. 11 shows the values of the switching time $\tau_s$ for each of the fixed films obtained in Examples 5 and 6, plotted in relation to the logarithm of the electric field intensity. The liquid crystal ZLI-3489 when used alone exhibits a substantially linear characteristic, thus proving that the characteristic follows the rule of power. In the case of the composite film of the present invention, the switching time $\tau_s$ coincides with the dielectric relaxation time so that the switching curve coincides with the dielectric relaxation curve in the time region when the electric field intensity is low. However, the switching time $\tau_s$ becomes smaller as the electric field intensity is increased, well following the rule of power. From this fact, it is understood that the switching time is increased by virtue of the complexing.

ADVANTAGES OF THE INVENTION

As has been described, the polymer film produced in accordance with the present invention is a porous polymer film having a structure in which spherical pores are uniformly dispersed in the form of independent pores or partially continuous form. The composite film obtained by impregnating and filling this porous polymer film with a low molecular substance such as liquid crystal and/or dye exhibits both the functions possessed by the polymer and the functions possessed by the low molecular substance. The complexing of a functional low molecular substance and a functional polymer produces an effect in which the functions of both phases are multiplied by each other.

Furthermore, the pore size in the polymer film obtained in accordance with the present invention is easy to control, so that a composite film having a short switching time can be produced easily.

Thus, the porous polymer film obtained in accordance with the present invention exhibit remarkable improvements in electrical characteristics such as dielectric constant, non-linear optic effect, and optical characteristics such as double refraction, by virtue of inter-action between factors such as the shape and state of dispersion of pores in the porous polymer film, interface effect between the low molecular substance and polymer, and so forth.

Needless to say, the porous polymer film produced by the process of the invention can be used not only for the purpose of fixing a functional low molecular substance such as liquid crystal but can be applied to various other uses.

We claim:

1. A process for producing a composite polymer film comprising;
   (a) preparing a first solution of polymer by dissolving a polymer in a first solvent in which said polymer is readily dissolved;
   (b) uniformly dispersing a second solvent, in which said polymer is only poorly dissolved, consisting essentially of either ethanol or methanol and water, into said first solution of polymer to form a uniform dispersion of said second solvent in said first solution of polymer;
   (c) evaporating said first solvent from said uniform dispersion;
   (d) producing a porous polymer film by evaporating said second solvent by drying under heat over 10° C.; and
   (e) filling said porous film with a substance.

2. A process according to claim 1, wherein said substance is liquid crystal.

3. A process according to claim 1, wherein said substance is dye.

4. A process according to claim 1, wherein said substance is a mixture system of a liquid crystal and a dye.

5. A process according to claim 1, wherein the pore size of said porous polymer film is controlled by controlling the amount of said water in said second solvent.

6. A process according to claim 5, wherein said pore size is controlled to be 10 $\mu m$ or smaller by controlling the amount of said water.

7. The process according to claim 1, wherein said first solvent is selected from the group consisting of tetrahydrofuran, cyclohexanone, methylethylketone and dimethyl formamide; and
   said polymer is polyvinyl chloride.

8. The process according to claim 1, wherein said first solvent is selected from the group consisting of chloroform, methanol, acetone and butyl acetate; and
   said polymer is polyvinyl acetate.

9. A process according to claim 1, wherein said first solvent is selected from the group consisting of acetone, ethylacetate, tetrahydrofuran and toluene; and
   said polymer is selected from the group consisting of polyacrylate ester and polymethacrylate ester.

10. The process according to claim 1, wherein said first solvent is dimethylformamide; and
    said polymer is polyacrylonitrile.

11. The process according to claim 1, wherein said first solvent is selected from the group consisting of benzene and dimethyl formamide; and
    said polymer is polyethylene oxide.

12. The process according to claim 1, wherein said first solvent is selected from the group consisting of acetone, methylethylketone, cyclohexanone ketone, methyl acetate, methyl acrylate, ethylene oxide, propylene oxide, tetrahydrofuran, dioxane, n-butylamine, dimethylformamide, and dimethylacetoamide; and
    said polymer is selected from the group consisting of vinylidene fluoride and vinylidene cyanate or a mixture thereof.

13. The process of claim 1, wherein said substance is selected from the group consisting of a liquid crystal, a dye and a mixture thereof.

* * * * *

UNITED STATES PATENT AND TRADEMARK OFFICE
CERTIFICATE OF CORRECTION

PATENT NO. : 5,238,636
DATED : August 24, 1993
INVENTOR(S) : Takeo Furukawa et al.

It is certified that error appears in the above-indentified patent and that said Letters Patent is hereby corrected as shown below:

On the title page, [30],

The Foreign Application Priority Data, should read:

--Mar. 7, 1988  [JP]  Japan.................63-53290

Mar. 7, 1989  [PCT]  PCT................PCT/JP89/00239--

Signed and Sealed this

Twenty-ninth Day of March, 1994

Attest:

BRUCE LEHMAN

*Attesting Officer*　　　*Commissioner of Patents and Trademarks*